Patented Jan. 13, 1953

2,625,557

UNITED STATES PATENT OFFICE 2,625,557

PURIFICATION OF ACYL P-AMINOPHENOLS WITH ISOPROPYL ALCOHOL

Delmer L. Cottle, Highland Park, and David W. Young, Westfield, N. J., assignors to Standard Oil Development Company, a corporation of Delaware No Drawing. Application June 30, 1951, Serial No. 234,676

9 Claims. (Cl. 260—404)

This invention relates to a novel process for preparing acyl p-aminophenols of higher molecular weight than acetyl p-aminophenol.

This application is a continuation-in-part of U. S. application Serial No. 185,326, filed September 16, 1950.

Acyl p-aminophenols of higher molecular weight than acetyl p-aminophenol have been finding ever-increasing utility as anti-oxidants for relatively non-volatile organic materials which normally tend to deteriorate in storage due to undesirable oxidation reactions (e. g., see parent application Serial No. 185,326, filed September 16, 1950).

These particular acyl p-aminophenols were prepared by a condensation reaction which comprised reacting the indicated stoichiometrical amount of a monocarboxylic acid derivative, e. g., an organic monocarboxylic acid anhydride, anhydrous acid, acid chloride in the presence of an entraining solvent, such as benzene, toluene, or xylene, with para-aminophenol. The methyl esters of the organic monocarboxylic acid could also be utilized, and in that case methanol was obtained as one of the condensation reaction products. The solid reaction product was then dehydrated by evaporation.

It is to be understood that wherever the term "monocarboxylic acid derivative" is used hereafter and in the claims, this term also connotes the indicated monocarboxylic acid derivatives which are equivalent to the acids themselves and can be utilized in the indicated condensation reaction.

The above-listed method of preparation of the anti-oxidants suffers from certain disadvantages. P-aminophenol, an intermediate in the preparation of dyes, is difficult to obtain in a very white and pure form. The products of the condensation reaction consequently are also colored, probably because of the presence of by-products. The products are also further colored by undesirable degradation reactions which take place during the course of the rather long reaction. The obtaining of a colored product is completely undesirable in view of the fact that the anti-oxidants find extensive use in clear resins and plastics which cannot tolerate colored additives.

This invention provides a method of preparing acyl p-aminophenols of higher molecular weight than acetyl p-aminophenols free of these beforementioned difficulties. The method of this invention comprises dissolving the reaction product of the above-indicated condensation reaction in relatively anhydrous isopropyl alcohol at a temperature close to the boiling point of the latter, i. e., 80° C. to 82.3° C. This causes the reaction product to dissolve in the alcohol. Water is then added to the agitated solution, which is cooled rather slowly to about room temperature, i. e., about 15° to 30° C. The acyl p-aminophenols crystallize out of solution and are of a water white color and completely free of undesirable colored impurities which are more soluble in the water-alcohol phase.

The term "relatively anhydrous" isopropyl alcohol connotes isopropyl alcohol containing no more than about 5 vol. % water. The water added to the isopropyl alcohol solution is added in an amount of about 25 to 75 vol. percent based on the alcohol utilized. To obtain increased purity several recrystallizations can be performed.

It is also preferred in practicing this invention that when an organic monocarboxylic acid itself is employed in the condensation reaction it be employed in excess amount of 10 to 100% based on the stoichiometrical requirements. Under these conditions the reaction time for 95 to 100% yield is more than halved. Because of this shortened reaction time and higher yield, the final product also contains better color.

Excess fatty acid may or may not be removed from the final product, as it is the custom in certain formulations, e. g., rubber compounding, to add fatty acids to final products that contain sulfur, anti-oxidants, carbon black, etc.

It is especially surprising to find that the isopropyl alcohol treatment described is so effective in view of the fact that other conventional solvents such as other alcohols, ketones, esters, acetic acid, ether, benzene, benzene-ether mixtures, ether-water mixtures, water, methanol, methanol-water, ethanol, etc., are not nearly as effective.

The method of this invention is thus adapted for the preparation of acyl p-aminophenol compounds of the type illustrated in Formula I below:

Formula I wherein R is a hydrocarbon radical having at least three carbon atoms being derived from an organic monocarboxylic acid having at least four carbon atoms. R can thus be an aliphatic, aromatic, alicyclic or alkaryl radical.

Those compounds wherein the R is an alkyl radical having from 3 to 21 carbon atoms are especially adapted to be prepared by the process of this invention utilizing $C_4$–$C_{22}$ aliphatic monocarboxylic acid derivatives.

Among the particular compounds which thus may be utilized for the purpose of this invention are the following acids: Butyric ($C_4$); caprylic ($C_8$); capric ($C_{10}$); lauric ($C_{12}$); myristic ($C_{14}$); palmitic ($C_{16}$); stearic ($C_{18}$; undecylenic ($C_{11}$=); oleic ($C_{18}$=); linoleic ($C_{18}$=); benzoic; cyclohexylvaleric ($C_{11}$); cyclohexylcaproic; $C_8$ oxo acids; $C_9$ oxo acid; naphthenic acids. The $C_{12}$ aliphatic monocarboxylic acids derived from coconut fatty acids are especially effective for use.

The general formula for the reaction utilized in this invention is indicated below in Equation I:

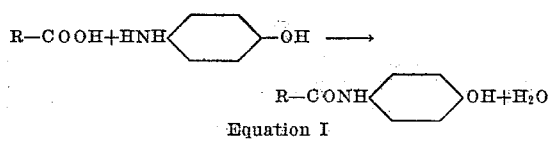

Equation I

The following examples illustrate this invention and the preparation of the indicated compounds.

*Example I.—N-lauroyl-p-aminophenol from p-aminophenol and lauric acid*

Para aminophenol (27.25 g.; one quarter mole) and cocoanut acid oil (100 g.; one half mole—100% excess) which contained principally lauric acid, a $C_{12}$ aliphatic monocarboxylic acid, were placed in a 500 ml. Pyrex R. B. flask fitted with a 25 ml. side arm and water cooled condenser. The solvent used was xylene (50 g.). An electric heater was used to boil the xylene for 3½ hours and azeotrope out 4.5 ml. of water. During the heating step, all air was excluded from the reaction by the use of a Hg. trap. After the reaction was over the heat was removed and the materials allowed to cool to about 90° C. At this point the mixture was poured into 400 ml. of 99% isopropyl alcohol. The solution was then heated to the B. Pt. and then diluted with 300 ml. of distilled water. The product, in paste form, was removed from the isopropyl alcohol upon cooling and agitating at 20° C. At this point the paste was scraped from the beaker and placed on a Buchner filter fitted on top with a thin rubber mat or dam. Vacuum was used to remove all the mother liquor (dark in color) from the wet white product. The dry product at this point was light gray and not light stable. Therefore, to improve the color of the product the gray material was redissolved in 300 ml. of hot 99% isopropyl alcohol and then once again diluted with water (150 ml.) and cooled to 20° C. Upon filtering and drying for two days over $CaCl_2$ with 24″ vacuum a white light stable product resulted. Final weight of product was 86 grams. The material had a melting point of 121° C. The product was water white as it melted.

*Example II.—N-palmitoyl-p-aminophenol from p-aminophenol and palmitic acid ($C_{16}$)*

One mole of para aminophenol was placed in a 2 neck 1 l. Pyrex flask with 1 mole of palmitic acid. To this mixture was added 200 ml. of xylene. The mixture was heated under reflux to azeotrope off the water of reaction. After about 8 hours 85% of the water was removed. The hot mixture, dark in color, was added to 1 l. of 99% isopropyl alcohol. The agitated mixture was heated to the boiling point of the isopropyl alcohol for about 5 minutes. After this the blue solution of alcohol, etc., was slowly treated with 400 ml. of cold distilled water. The mixture was well agitated as the water was added. The total time required to add the water was 10 minutes. The mixture was then cooled to 20° C. and filtered through a Buchner with good vac. (24″). A rubber dam or rubber sheet was placed over the Buchner to assist in the removal of the mother liquor. A white product resulted with a M. Pt. of 128°–129° C. Upon analysis the sample had 4.04% N. The theoretical N for the sample was calculated to be 4.04%.

There are several distinct advantages inherent in the process of this invention. Among these is the fact that the reaction is straightforward and relatively rapid. Product degradation is thus kept at a minimum. In addition, white products are obtained free of undesirable colors. Other advantages will be apparent to those skilled in the art.

Alkylated nuclear compounds can be prepared by the method of this invention as well.

It is to be understood that the invention is not limited to the specific examples, which have been offered merely as illustrations, and that modifications may be made in equipment and conditions within the range specified without departing from the spirit of this invention.

What is claimed is:

1. In a process for the preparation of an acyl p-aminophenol corresponding to the general formula

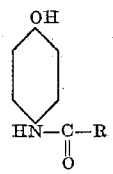

wherein R is a hydrocarbon radical having at least three carbon atoms, which comprises condensing p-aminophenol with an organic monocarboxylic acid derivative having at least four carbon atoms and capable of condensing with the p-aminophenol, the improvement which comprises the steps of dissolving the reaction product in relatively anhydrous isopropyl alcohol; adding water to the resulting solution; cooling the resulting isopropyl alcohol-water system to a temperature in the range of about 15° to 30° C.; and separating the acyl p-aminophenol thus rendered insoluble from the isopropyl alcohol water system.

2. A process as in claim 1 in which the organic monocarboxylic acid derivative is an organic monocarboxylic acid and is present in an excess amount of 10 to 100 mole per cent based on the acyl p-aminophenol.

3. In a process for the preparation of an acyl p-aminophenol corresponding to the general formula

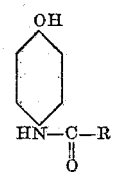

wherein R is an alkyl radical having from 3 to 21 carbon atoms, which comprises condensing p-aminophenol with an aliphatic monocarboxylic acid derivative having from 4 to 22 carbon atoms and capable of condensing with the p-aminophenol, the improvement which comprises the steps of dissolving the reaction product in relatively anhydrous isopropyl alcohol at a temperature close to its boiling point; adding water to the resulting solution; cooling the resulting isopropyl alcohol-water system to a temperature in the range of about 15° to 30° C.; and separating the acyl p-aminophenol rendered insoluble from the isopropyl alcohol-water system.

4. A process as in claim 3 in which the organic monocarboxylic acid derivative is an organic monocarboxylic acid and is present in an excess amount of 10 to 100 mole per cent based on the acyl p-aminophenol.

5. A process as in claim 3 in which the water added to the solution is added in an amount of from 25 to 75 vol. per cent based on the alcohol utilized.

6. A process as in claim 3 in which the temperature close to the boiling point of isopropyl alcohol is in the range of 80° to 82.3° C.

7. In a process for the preparation of lauroyl p-aminophenol which comprises condensing para aminophenol with lauric acid, the improvement which comprises the steps of utilizing the lauric acid in an amount of from 110 to 200 mole per cent based on the p-aminophenol; dissolving the resulting reaction product in a relatively anhydrous isopropyl alcohol at a temperature close to its boiling point; adding water to the resulting solution; cooling the water, isopropyl alcohol system to a temperature in the range of about 15° to 30° C., whereby the lauryl p-aminophenol comes out of the solution but the impurities remain dissolved; and separating the lauryl p-aminophenol from the residual system.

8. A process as in claim 7 in which the water added to the solution is added in an amount of from 25 to 75 vol. per cent based on the alcohol utilized.

9. A process as in claim 7 in which the temperature of the isopropyl alcohol close to its boiling point is in the range of 80° to 82.3° C.

DELMER L. COTTLE.
DAVID W. YOUNG.

REFERENCES CITED

The following references are of record in the file of this patent:

UNITED STATES PATENTS

| Number | Name | Date |
| --- | --- | --- |
| 1,475,477 | Ellis | Nov. 27, 1923 |
| 2,568,571 | Sullivan | Sept. 18, 1951 |

FOREIGN PATENTS

| Number | Country | Date |
| --- | --- | --- |
| 439,807 | Great Britain | Dec. 12, 1935 |